United States Patent
Vootukuru et al.

(10) Patent No.: US 9,785,209 B2
(45) Date of Patent: Oct. 10, 2017

(54) THERMAL MANAGEMENT IN A COMPUTING DEVICE BASED ON WORKLOAD DETECTION

(71) Applicant: QUALCOMM INCORPORATED, San Diego, CA (US)

(72) Inventors: Anil Vootukuru, San Diego, CA (US); Ankur Jain, San Diego, CA (US); Unnikrishnan Vadakkanmaruveedu, Phoenix, AZ (US); Vinay Mitter, San Diego, CA (US); Christopher Lee Medrano, Longmont, CO (US)

(73) Assignee: QUALCOMM Incorporated, San Diego, CA (US)

( * ) Notice: Subject to any disclaimer, the term of this patent is extended or adjusted under 35 U.S.C. 154(b) by 325 days.

(21) Appl. No.: 14/675,393

(22) Filed: Mar. 31, 2015

(65) Prior Publication Data

US 2016/0291653 A1 Oct. 6, 2016

(51) Int. Cl.
| | |
|---|---|
| *G01K 13/00* | (2006.01) |
| *G06F 1/20* | (2006.01) |
| *G05B 15/02* | (2006.01) |
| *G01K 7/42* | (2006.01) |
| *G06F 1/32* | (2006.01) |

(52) U.S. Cl.
CPC ............ *G06F 1/206* (2013.01); *G01K 7/427* (2013.01); *G01K 13/00* (2013.01); *G05B 15/02* (2013.01); *G06F 1/203* (2013.01); *G06F 1/324* (2013.01); *G06F 1/3206* (2013.01); *G06F 1/3243* (2013.01); *G06F 1/3296* (2013.01); *Y02B 60/1217* (2013.01); *Y02B 60/1239* (2013.01); *Y02B 60/1285* (2013.01)

(58) Field of Classification Search
CPC ........ G01K 13/00; G01K 7/427; G05B 15/02; G06F 1/203; G06F 1/206; G06F 1/3206; G06F 1/324; G06F 1/3243; G06F 1/3296; Y02B 60/1217; Y02B 60/1239; Y02B 60/1285

See application file for complete search history.

(56) References Cited

U.S. PATENT DOCUMENTS

| 8,171,325 | B2 * | 5/2012 | Brillhart ................. G06F 1/206 709/223 |
|---|---|---|---|
| 8,306,772 | B2 | 11/2012 | Cox et al. |
| 8,315,746 | B2 | 11/2012 | Cox et al. |

(Continued)

OTHER PUBLICATIONS

International Search Report and Written Opinion—PCT/US2016/020002—ISA/EPO—May 24, 2016.

*Primary Examiner* — M Elamin
*Assistant Examiner* — Abdelmoniem Elamin
(74) *Attorney, Agent, or Firm* — Smith Tempel Blaha LLC (57) ABSTRACT

Thermal management in a portable computing device differentiates between a temperature increase caused by a steady workload and a temperature increase caused by an instantaneous workload. If it is determined that a detected temperature increase is caused by a steady workload, then a configuration of thermal parameters is applied that optimizes thermal performance for a steady workload. If it is determined that a temperature increase is caused by an instantaneous workload increase, then a configuration of thermal parameters is applied that optimizes thermal performance for an instantaneous workload.

27 Claims, 6 Drawing Sheets

(56) References Cited

U.S. PATENT DOCUMENTS

| | | | |
|---|---|---|---|
| 8,452,463 B2 | 5/2013 | Cox et al. | |
| 8,768,530 B2 | 7/2014 | Liang et al. | |
| 8,942,857 B2 | 1/2015 | Anderson et al. | |
| 8,972,759 B2 * | 3/2015 | Doshi | G06F 1/3203 |
| | | | 713/320 |
| 9,218,041 B2 * | 12/2015 | Sur | G06F 1/3234 |
| 9,341,520 B2 * | 5/2016 | Vadakkanmaruveedu | G01K 7/16 |
| 9,354,679 B2 * | 5/2016 | Gough | G06F 1/206 |
| 9,501,112 B2 * | 11/2016 | Nelson | G06F 1/206 |
| 9,605,840 B1 * | 3/2017 | Zou | F21V 29/673 |
| 2010/0169039 A1 | 7/2010 | Hosokawa | |
| 2014/0240031 A1 * | 8/2014 | Vadakkanmaruveedu | G06F 1/206 |
| | | | 327/512 |
| 2014/0371944 A1 * | 12/2014 | Vadakkanmaruveedu | G01K 7/16 |
| | | | 700/299 |
| 2015/0005980 A1 | 1/2015 | Kim et al. | |
| 2015/0169016 A1 * | 6/2015 | Doshi | G06F 1/3203 |
| | | | 713/320 |

\* cited by examiner

THERMAL MANAGEMENT IN A COMPUTING DEVICE BASED ON WORKLOAD DETECTION

DESCRIPTION OF THE RELATED ART

Portable computing devices ("PCD"s) are becoming necessities for people on personal and professional levels. These devices may include cellular telephones, portable digital assistants, portable game consoles, palmtop computers, and other portable electronic elements.

In operation, the electronic circuitry within a PCD generates heat or thermal energy, which at excessive levels may be detrimental to the circuitry. The amount of thermal energy that is generated may vary depending upon the operating conditions. For example, in an instance in which a PCD is wirelessly transmitting data for a sustained time period at a high power level, the power amplifier that feeds the antenna may generate a potentially detrimental amount of thermal energy. Integrated circuit chips, such as processors, may also generate substantial thermal energy when operating at high workload levels.

Some PCDs include thermal sensors positioned near the electronic circuitry that the PCD processor may monitor to determine if the PCD or portion thereof has reached a threshold or critical temperature. When a reading of the thermal sensor indicates that a PCD has reached such a threshold temperature, the processor may initiate an action intended to reduce thermal energy production or otherwise mitigate the effects of the thermal energy. For example, the processor may temporarily reduce power to some of the electronics generating the thermal energy, such as the power amplifier, in order to allow the PCD to dissipate the excess thermal energy. Another action that the processor may take is to disable certain power-intensive functions, such as receiver diversity in a transceiver having a diversity receiver feature. Still another action that the processor may take is to reduce transmitter throughput. The set of actions that the processor takes in response to one or more temperature readings exceeding one or more threshold levels may be referred to as a "thermal management scheme." A processor may select one of a number of thermal management schemes depending on the sensors and threshold levels involved.

SUMMARY OF THE DISCLOSURE

Systems, methods, and computer program products are disclosed for thermal management in a portable computing device that differentiate between temperature changes caused by steady workload and temperature changes caused by instantaneous workload.

In an exemplary method for thermal management, a plurality of temperature sensors are monitored. The temperature sensors include at least one first temperature sensor on an integrated circuit die and at least one second temperature sensor that is not on the integrated circuit die but is within a housing of the portable computing device. If a temperature change is detected, the difference between a first temperature value responsive to the at least one first temperature sensor and a second temperature value responsive to the at least one second temperature sensor is computed. The difference is then compared with a threshold value. Depending upon the result of the comparison, either a first thermal management configuration or a second thermal management configuration is selected and applied to the portable computing device.

An exemplary system for thermal management includes at least one first temperature sensor on an integrated circuit die and at least one second temperature sensor that is not on the integrated circuit die but is within a housing of the portable computing device. The exemplary system further includes a monitor module configured to monitor the first and second temperature sensors and to detect a temperature change. The exemplary system also includes a workload determination module configured to compute a difference between a first temperature value responsive to the at least one first temperature sensor and a second temperature value responsive to the at least one second temperature sensor, to compare the difference with a threshold value, to select either the first thermal management configuration or a second thermal management configuration in response to the result of the comparison, and to apply the selected thermal management configuration to the portable computing device.

An exemplary computer program product for thermal management includes processor-executable logic embodied in a non-transitory storage medium. Execution of the logic by a processor system configures the processor system to: monitor a plurality of temperature sensors including at least one first temperature sensor on an integrated circuit die and at least one second temperature sensor not on the integrated circuit die but within a housing of the portable computing device; detect a temperature change in response to monitoring the plurality of temperature sensors; in response to detecting a temperature change, compute a difference between a first temperature value responsive to the at least one first temperature sensor and a second temperature value responsive to the at least one second temperature sensor; compare the difference with a threshold value; select one of a first thermal management configuration and a second thermal management configuration in response to a result of comparing the difference with the threshold value; and apply the selected thermal management configuration to the portable computing device.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same Figure. Letter character designations for reference numerals may be omitted when it is intended that a reference numeral to encompass all parts having the same reference numeral in all Figures.

DETAILED DESCRIPTION

The word "exemplary" is used herein to mean "serving as an example, instance, or illustration." Any aspect described herein as "exemplary" is not necessarily to be construed as preferred or advantageous over other aspects.

The terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes, such as in accordance with a signal having one or more data packets (e.g., data from one component interacting with another component in a local system, distributed system, and/or across a network such as the Internet with other systems by way of the signal).

The term "application" or "image" may also include files having executable content, such as: object code, scripts, byte code, markup language files, and patches. In addition, an "application" referred to herein, may also include files that are not executable in nature, such as documents that may need to be opened or other data files that need to be accessed.

The terms "central processing unit ("CPU")," "digital signal processor ("DSP")," graphics processing unit ("GPU"), "modem," and "chip" are non-limiting examples of processing components that may reside in a PCD and are used interchangeably except where otherwise indicated. Moreover, as distinguished in this description, a CPU, DSP, modem or chip may comprise one or more distinct processing components generally referred to herein as "core(s)" and "sub-core(s)."

In this description, it will be understood that the terms "thermal" and "thermal energy" may be used in association with a device or component capable of generating or dissipating energy that can be measured in units of "temperature." Consequently, it will further be understood that the term "temperature," with reference to some standard value, encompasses any measurement that may be indicative of the relative warmth, or absence of heat, of a "thermal energy"-generating device or component.

In this description, the terms "workload," "process load," "process workload" and "block of code" are used interchangeably and generally directed toward the processing burden, or percentage of processing burden, that is associated with, or may be assigned to, a given processing component in a given embodiment. Further to that which is defined above, a "processing component" or "thermal energy-generating component" or "thermal aggressor" may be, but is not limited to, a CPU, GPU, core, main core, sub-core, processing area, hardware engine, etc., or any component residing within, or external to, an integrated circuit within a portable computing device.

In this description, the term "portable computing device" ("PCD") is used to describe any device operating on a limited-capacity power supply, such as a battery, and lacking a system for removing excess thermal energy (i.e., for cooling, such as a fan, etc.). Although battery operated PCDs have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a laptop or hand-held computer with a wireless connection, or a combination of the aforementioned devices, among others.

Figure 1:
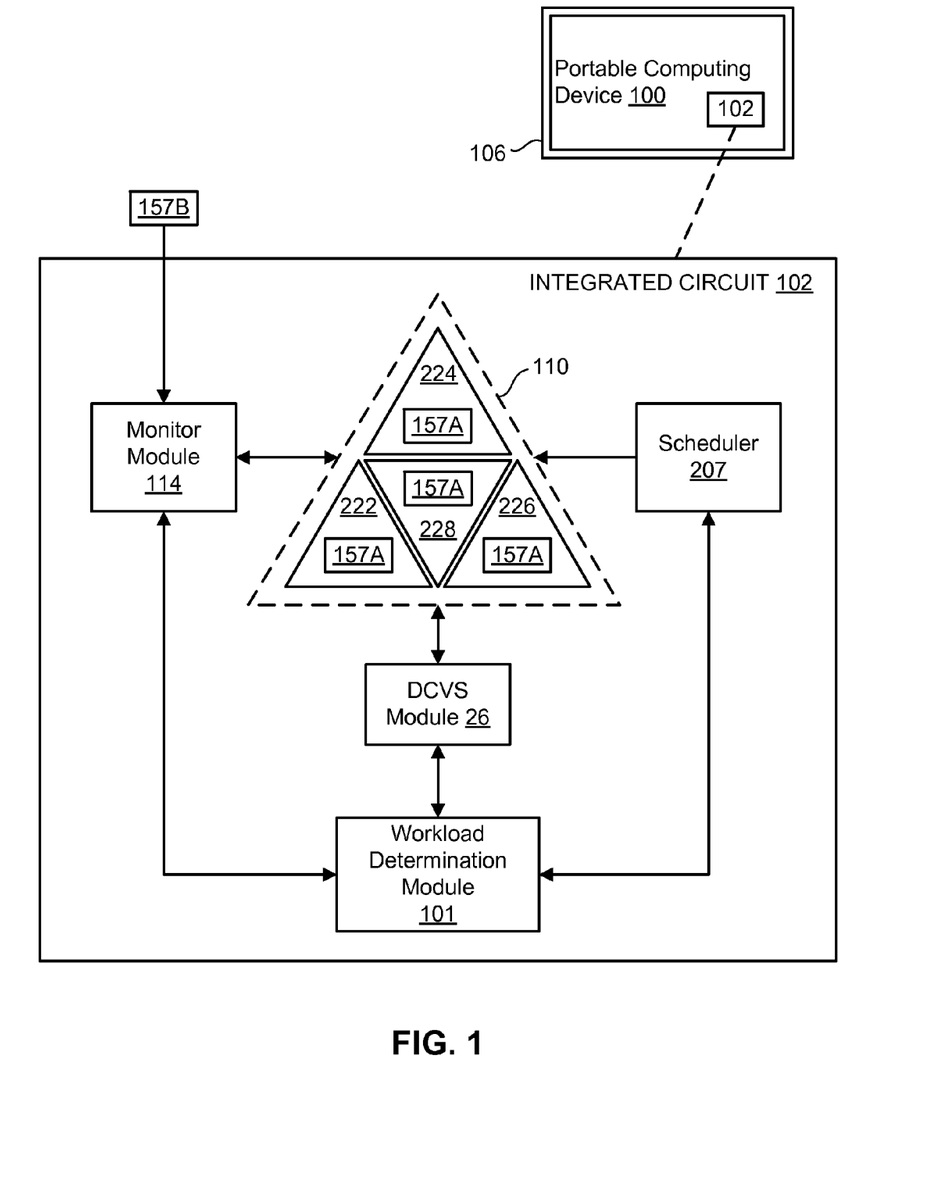
FIG. 1 is a block diagram of a system for thermal management, in accordance with an exemplary embodiment.

As illustrated in FIG. 1, in an illustrative or exemplary embodiment, a PCD 100 includes an on-chip system 102, i.e., a system embodied in an integrated circuit chip. On-chip system 102 is configured to provide thermal management in PCD 100 by adjusting parameters such as clock frequencies and workloads in response to thermal conditions. More specifically, on-chip system 102 may adjust one or more of power supply voltage, clock generator frequency, and workload allocation across thermally aggressive components on on-chip system 102, such as individual processors or cores 222, 224, 226 and 228. Although thermal management is described in this specification in relation to an embodiment in which the thermal aggressors 110 are cores 222, 224, 226 and 228, in other embodiments such thermal aggressors may include, for example, a CPU, GPU, DSP, programmable array, video encoder/decoder, system bus, camera or image processing subsystem, etc.

The on-chip system 102 may monitor multiple internal temperature sensors 157A as well as at least one external temperature sensor 157B (collectively referred to as temperature sensors 157). Each internal temperature sensor 157A may be associated with and configured to sense the temperature of one of cores 222, 224, 226 and 228. External temperature sensor 157B is configured in the exemplary embodiment to sense the temperature of the housing 106 of PCD 100, commonly referred to as the device's "skin temperature."

A monitor module 114 is coupled to temperature sensors 157 to monitor their temperature readings. Monitor module 114 is also coupled to a workload determination module 101. Workload determination module 101 is coupled to a dynamic clock and voltage scaling ("DCVS") module 26 and a scheduler module 207.

Figure 2:
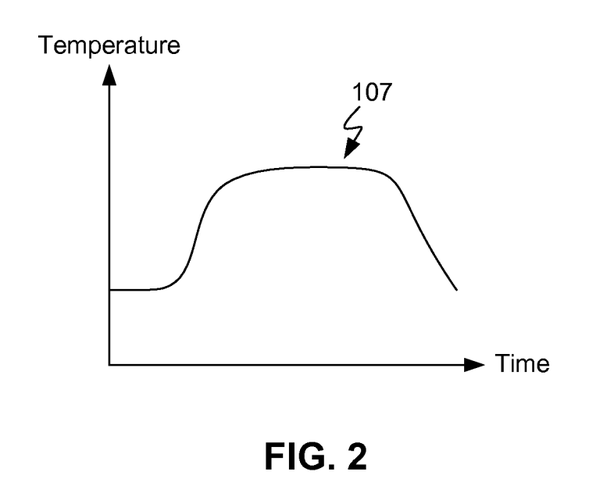
FIG. 2 is a plot illustrating an increase in temperature over time caused by a steady workload.
Figure 3:
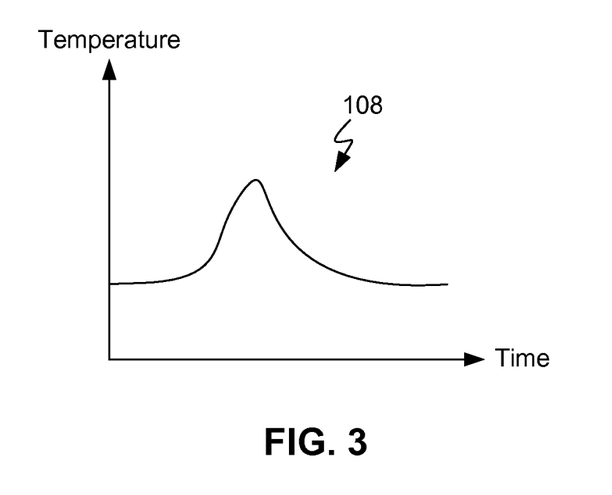
FIG. 3 is a plot illustrating an increase in temperature over time caused by an instantaneous workload.

As illustrated in FIG. 2, a first exemplary temperature reading plot 107 illustrates an increase in temperature that is sustained or remains steady over a time interval. Thus, plot 107 has a substantially level or steady appearance. An increase in temperature that remains level or steady over a time interval may be caused by an increase in processor workload that remains substantially steady over a time interval, referred to in this specification for convenience as a "steady workload." As illustrated in FIG. 3, a second exemplary temperature reading plot 108 illustrates a substantially brief or instantaneous increase in temperature over a time interval. Thus, plot 108 has an appearance resembling a peak. A substantially peaked increase in temperature over a time interval may be caused by a substantially peaked or instantaneous increase in processor workload over a time interval, referred to in this specification for convenience as an "instantaneous workload." It should be understood that plots 107 and 108 are intended only to be exemplary or for purposes of illustrating in a generalized manner the difference between a temperature increase caused by a "steady workload" and a temperature increase caused by an "instantaneous workload" as those terms are used in this specification. In various instances of operation of PCD 100, measured temperatures may change in any manner over various time intervals, and any corresponding plots (not shown) could have any of various appearances.

Referring again to FIG. 1, workload determination module 101 determines whether the temperature readings from temperature sensors 157 indicate that a detected temperature increase is caused by a steady workload or an instantaneous workload. If workload determination module 101 determines that a temperature increase is caused by a steady workload, then workload determination module 101 sets PCD 100 to operate under a first thermal management configuration that is optimized for a steady workload. If workload determination module 101 determines that a temperature increase is caused by an instantaneous workload, then workload determination module 101 sets PCD 100 to operate under a second thermal management configuration that is optimized for an instantaneous workload. DCVS module 26 may adjust voltage and clock frequency settings in accordance with the selected one of the first and second thermal management configurations. In accordance with the first thermal management configuration, workload determination module 101 may cause DCVS module 26 to adjust or set voltage and clock frequency settings that affect the operation of cores 222, 224, 226 and 228 to a first group of respective voltage and clock frequency settings. In accordance with the second thermal management configuration, workload determination module 101 may cause DCVS module 26 to adjust or set voltage and clock frequency settings that affect the operation of cores 222, 224, 226 and 228 to a second group of respective voltage and clock frequency settings. Alternatively, or in addition, workload determination module 101 may cause scheduler 207 to adjust or set the workloads assigned to cores 222, 224, 226 and 228 relative to one another in a manner that is dependent upon the determination of whether a detected temperature increase is caused by an instantaneous workload or a steady workload. For example, workloads may be distributed among cores 222, 224, 226 and 228 in one manner (i.e., a first distribution) when it is determined that a temperature increase is the result of an instantaneous workload and distributed among cores 222, 224, 226 and 228 in a different manner (i.e., a second distribution) when it is determined that a temperature increase is the result of a steady workload.

The thermal energy produced by one or more of cores 222, 224, 226 and 228 may fluctuate in accordance with their workloads. As the thermal energy generation level associated with each of cores 222, 224, 226 and 228 changes, monitor module 114 senses the change as measured by temperature sensors 157A and may transmit temperature data indicating the changes to workload determination module 101. Similarly, monitor module 114 may recognize changes in the skin temperature as measured by temperature sensor 157B and may transmit temperature data indicating the change to workload determination module 101. As described in further detail below, the difference between a processor core temperature measurement and a skin temperature measurement may be indicative of whether a temperature increase is caused by an instantaneous workload or a steady workload.

Figure 4:
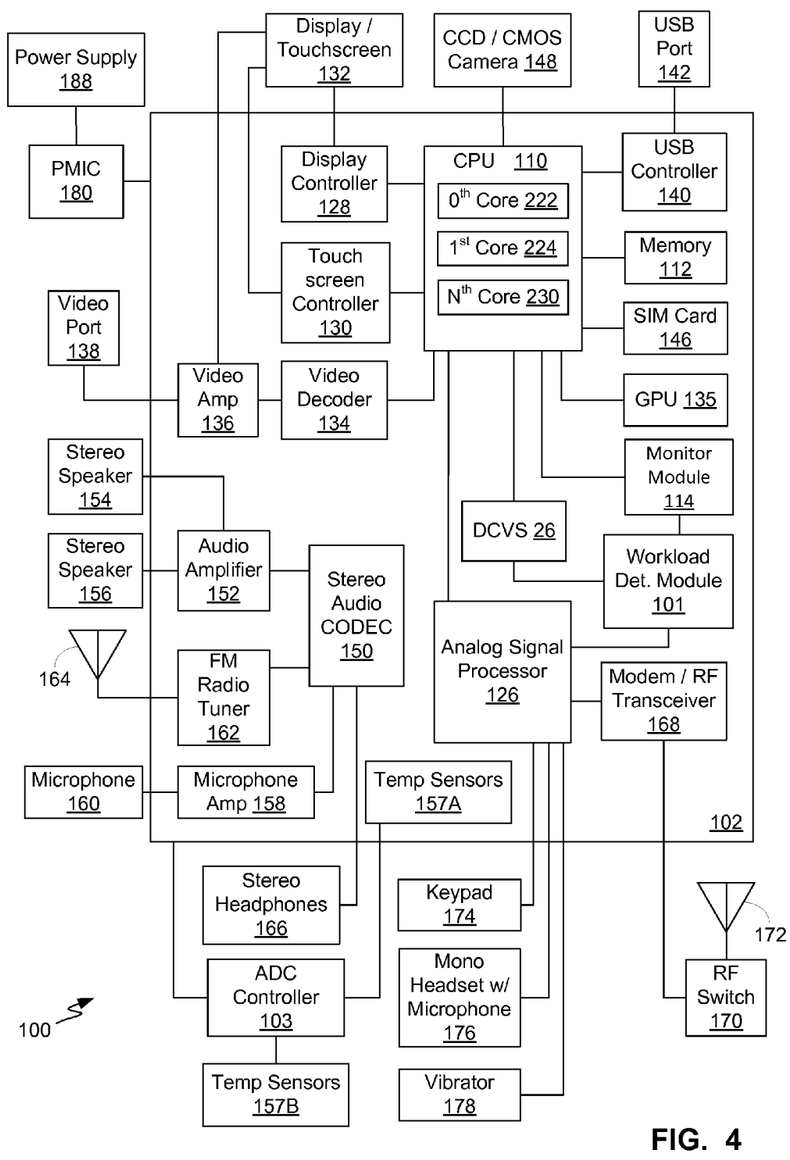
FIG. 4 is a block diagram of a portable computing device configured for thermal management, in accordance with an exemplary embodiment.

As illustrated in FIG. 4, PCD 100 may be a wireless telephone. In PCD 100, the processors of on-chip system 102 include CPU 110 and an analog signal processor 126 that are coupled together. The CPU 110 may comprise a plurality of cores, which may be referred to as a zeroth core 222, a first core 224, etc., though an Nth core 230, as understood by one of ordinary skill in the art. In other embodiments, a DSP (not shown) may be employed instead of CPU 110. A GPU 135 may be coupled to CPU 110.

Workload determination module 101 may receive temperature data from the monitor module 114 and, in response to the temperature data, selectively increase or decrease thermal energy generated by the cores 222, 224 and 230, GPU 135, or any other processor, via DCVS module 26 and/or selectively increase or decrease their relative workloads (i.e., task distribution among these elements) via scheduler 207 (FIG. 1). More generally, DCVS module 26 may selectively adjust clock and voltage parameters of any central processing unit, graphics processing unit, other processing unit, bus, memory controller, or other element of PCD 100, and/or scheduler 207 may selectively adjust task distribution among any such elements, in response to temperature data provided by monitor module 114. Scheduler 207 may be implemented as a software module that arises through execution of software by CPU 110. Monitor module 114 receives temperature data from one or more internal temperature sensors 157A at various locations within on-chip system 102 and from one or more external temperature sensors 157B that are external to on-chip system 102. Monitor module 114 is configured to communicate with CPU 110.

A display controller 128 and a touchscreen controller 130 are coupled to CPU 110. A touchscreen display 132 external to on-chip system 102 is coupled to display controller 128 and touchscreen controller 130.

PCD 100 may further include a video decoder 134, e.g., a phase-alternating line ("PAL") decoder, a sequential couleur avec memoire ("SECAM") decoder, a national television system(s) committee ("NTSC") decoder, or any other type. Video decoder 134 is coupled to CPU 110. A video amplifier 136 is coupled to video decoder 134 and touchscreen display 132. A video port 138 is coupled to video amplifier 136. A universal serial bus ("USB") controller 140 is also coupled to CPU 110, and a USB port 142 is coupled to USB controller 140. A memory 112 and a subscriber identity module ("SIM") card 146 may also be coupled to CPU 110. In addition, a digital camera 148 may be coupled to CPU 110. Digital camera 148 may be, for example, a charge-coupled device ("CCD") camera or a complementary metal-oxide semiconductor ("CMOS") camera.

A stereo audio CODEC 150 may be coupled to analog signal processor 126. Further, an audio amplifier 152 may be coupled to stereo audio CODEC 150. First and second stereo speakers 154 and 156, respectively, may be coupled to audio amplifier 152. In addition, a microphone amplifier 158 may be also coupled to stereo audio CODEC 150, and a microphone 160 may be coupled to microphone amplifier 158. A frequency modulation ("FM") radio tuner 162 may be coupled to stereo audio CODEC 150. An FM antenna 164 is coupled to the FM radio tuner 162. Further, stereo headphones 166 may be coupled to stereo audio CODEC 150.

A modem or radio frequency ("RF") transceiver 168 may be coupled to analog signal processor 126. An RF switch 170 may be coupled to RF transceiver 168 and an RF antenna 172. In addition, a keypad 174, a mono headset with a microphone 176, and a vibrator device 178 may be coupled to analog signal processor 126.

A power supply 188, such as a battery, is coupled to on-chip system 102 via a power management integrated circuit ("PMIC") 180. In a particular aspect, power supply 188 includes a rechargeable battery or a DC power supply that is derived from an AC-to-DC transformer connected to an AC power source.

Internal temperature sensors 157A may comprise, for example, one or more proportional to absolute temperature ("PTAT") temperature sensors that are based on vertical PNP structure of the type known to be usable with CMOS very large-scale integration ("VLSI") circuits. External temperature sensors 157B may comprise, for example, one or more thermistors. In response to temperature, temperature sensors 157 may produce a voltage drop. An analog-to-digital converter ("ADC") controller 103 converts the voltage drops to digital signals and provides the digital signals to on-chip system 102. However, in other embodiments other types of thermal sensors 157 may be employed without departing from the scope of the invention.

In the exemplary embodiment illustrated in FIG. 4, touch-screen display 132, video port 138, USB port 142, camera 148, first stereo speaker 154, second stereo speaker 156, microphone 160, FM antenna 164, stereo headphones 166, RF switch 170, RF antenna 172, keypad 174, mono headset 176, vibrator 178, thermal sensors 157B, PMIC 180 and power supply 188 are external to on-chip system 102. However, it should be understood that monitor module 114 may also receive one or more indications or signals from one or more of these external devices by way of analog signal processor 126 and CPU 110 to aid in the real-time management of the resources operable on PCD 100.

One or more of the method steps described in this specification may be implemented by processor-executable code or instructions stored in memory 112. In the exemplary embodiment, workload determination module 101 may include both a hardware portion and a software portion. The instructions that define the software portion may be executed by CPU 110, analog signal processor 126, ADC controller 103, or another processing element, to perform or control the methods described herein. Further, the processors 110, 126, the memory 112, the instructions stored therein, or a combination thereof may serve as a means for performing one or more of the method steps described herein.

Figure 5:
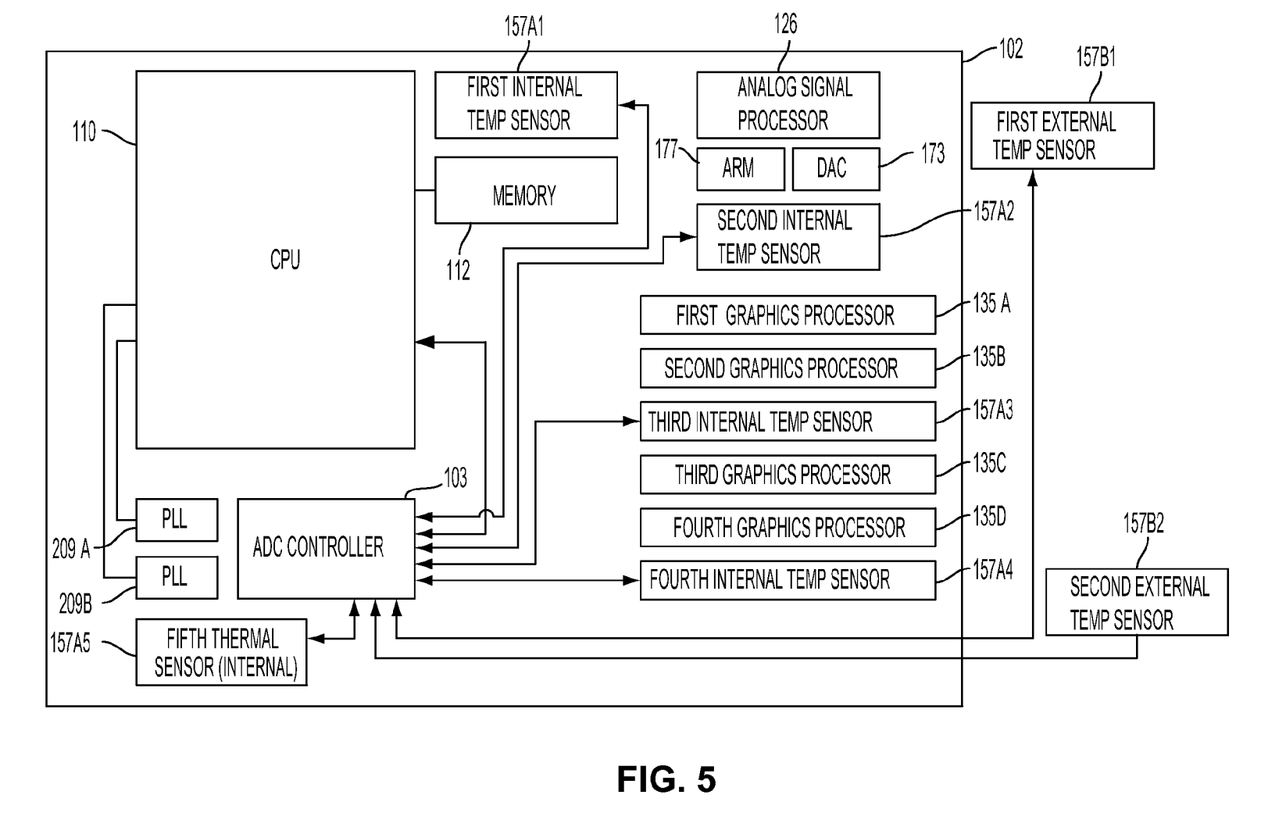
FIG. 5 is a hardware architecture diagram for the portable computing device.

As illustrated in FIG. 5, in an exemplary spatial arrangement of hardware elements of on-chip system 102, CPU 110 may be positioned in the far left side region of on-chip system 102 while analog signal processor 126 is positioned in a far right side region of on-chip system 102. CPU 110 may be coupled to one or more phase locked loops ("PLLs") 209A and 209B, which are positioned adjacent to CPU 110 and in the left side region of on-chip system 102. Adjacent to PLLs 209A and 209B and below CPU 110 may be positioned an analog-to-digital conversion ("ADC") controller 103.

The internal temperature sensors 157A may be positioned at various locations and associated with various components. For example, a first internal temperature sensor 157A1 may be positioned in a top center region of on-chip system 102 between CPU 110 and analog signal processor 126 and adjacent to memory 112. A second internal temperature sensor 157A2 may be positioned below analog signal processor 126 on a right side region of on-chip system 102. Second internal temperature sensor 157A2 also may be positioned between an advanced reduced instruction set computer ("RISC") instruction set machine ("ARM") 177 and a first graphics processor 135A. A digital-to-analog controller ("DAC") 173 may be positioned between the second internal temperature sensor 157A2 and analog signal processor 126. A third internal temperature sensor 157A3 may be positioned between a second graphics processor 135B and a third graphics processor 135C in a far right region of on-chip system 102. A fourth internal temperature sensor 157A4 may be positioned in a far right region of on-chip system 102 and below a fourth graphics processor 135D. And a fifth internal temperature sensor 157A5 may be positioned in a far left region of on-chip system 102 and adjacent to PLLs 209A and 209B and ADC controller 103.

One or more external temperature sensors 157B may also be coupled to the ADC controller 103. For example, a first external temperature sensor 157B1 may be positioned adjacent to but not in contact with a top right quadrant of on-chip system 102. A second external temperature sensor 157B2 may be positioned adjacent to but not in contact with a lower right quadrant of on-chip system 102. Either or both of first and second external temperature sensors 157B1 and 157B2 may be in contact with a substrate (not shown) on which on-chip system 102 is mounted (i.e., a circuit assembly), the housing 105 of PCD 100, or another structure that is not directly in contact with the various thermal aggressors, so as to provide a measurement of the skin temperature of PCD 100 rather than a measurement of the (die) temperature of on-chip system 102. One of ordinary skill in the art will recognize that various other spatial arrangements of the hardware elements illustrated in FIG. 5 may be provided without departing from the scope of the invention.

As understood by one of ordinary skill in the art, a thermal sensor commonly is characterized by a time constant. In the exemplary embodiment, the time constant of each internal temperature sensor 157A is substantially lower than the time constant of each external temperature sensor 157B. Consequently, in response to thermal energy generated by the various thermal aggressors in on-chip system 102, the temperatures sensed by internal temperature sensor 157A generally increase much faster than the temperatures sensed by external temperature sensors 157B. That is, in response to an increase in thermal energy, the signal that an internal temperature sensor 157A produces at a time after the increase represent a higher temperature than the signals that an external temperature sensor 157B produces at that time.

Figure 6:
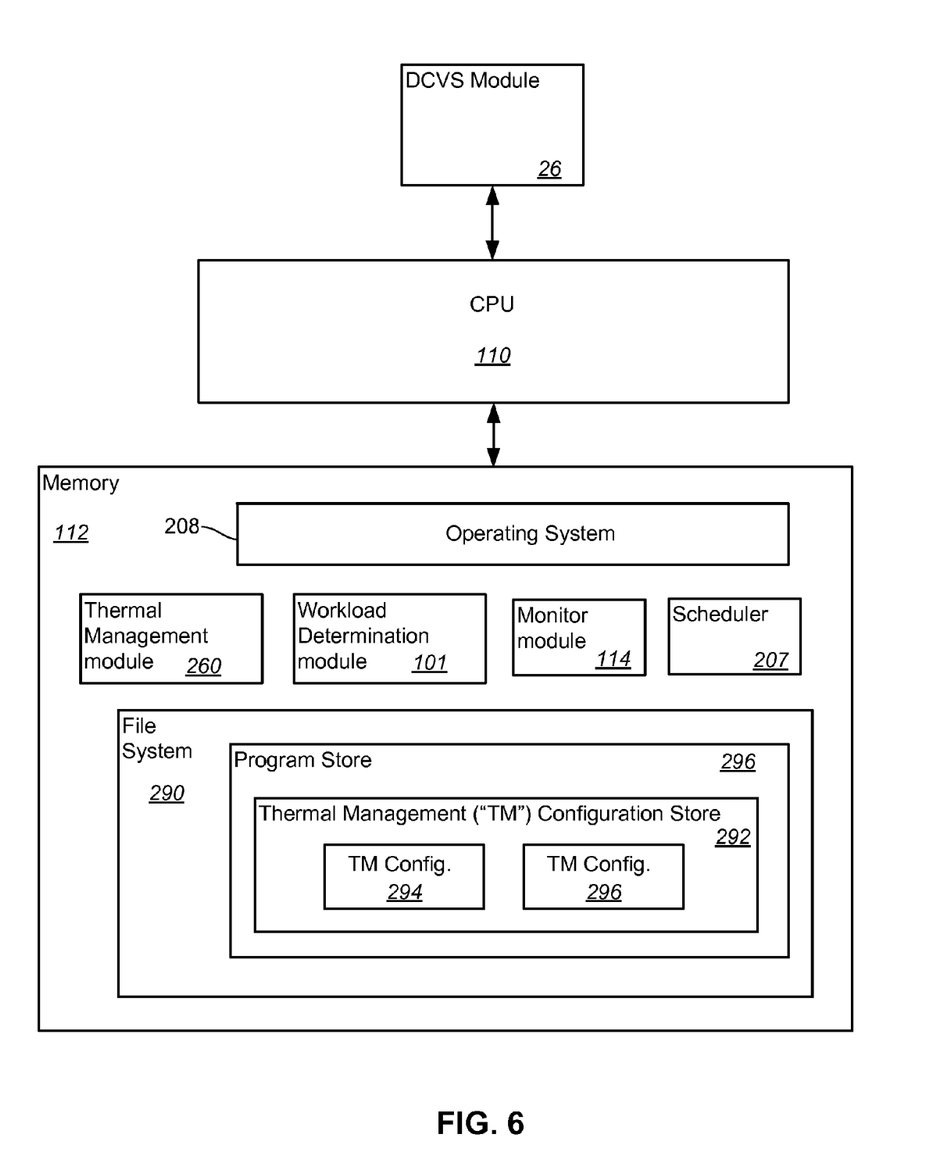
FIG. 6 is a software architecture diagram for the portable computing device.

As illustrated in FIG. 6, an exemplary software architecture may include an operating system module 208, in addition to scheduler 207, a software portion of workload determination module 101, and a software portion of monitor module 114. A thermal management module 260 that operates with workload determination module 101 may also be included. A file system 290 may contain a program store 296. Program store 296 may contain a thermal management configuration store 292. Thermal management configuration store 292 may contain a plurality of thermal management configurations 294 and 296 or similar sets of information. Although for purposes of illustrated such software modules or elements are conceptually shown as residing in memory 112, one of ordinary skill in the art understands that such software modules or elements arise through the execution of software code or instructions by CPU 110.

Each of thermal management configurations 294 and 296 includes data that describes a group of temperature threshold levels, clock and voltage levels, processor workload settings, and other settings or parameters that affect the generation of thermal energy by the various thermal aggressors of PCD 100 or the response to thermal information by processors or other control elements of PCD 100. Workload determination module 101 may select either thermal management configuration 294 or thermal management configuration 296. In response to such a selection, thermal management module 260 applies the settings or parameters of the selected configuration to the associated thermal aggressors or control elements of PCD 100. For example, DCVS module 26 may receive a set of parameters in response to which it adjusts clock frequencies applied to a set of thermal aggressors. When thermal management configuration 294 is applied, for example, DCVS module 26 may provide a first clock frequency to a processor or core, but when thermal management configuration 294 is applied, DCVS module 26 may provide a second clock frequency to that processor or core. Alternatively or in addition, CPU 110 may receive a set of parameters in response to which it adjusts workload distribution among cores 222, 224, 230, etc.

Figure 7:
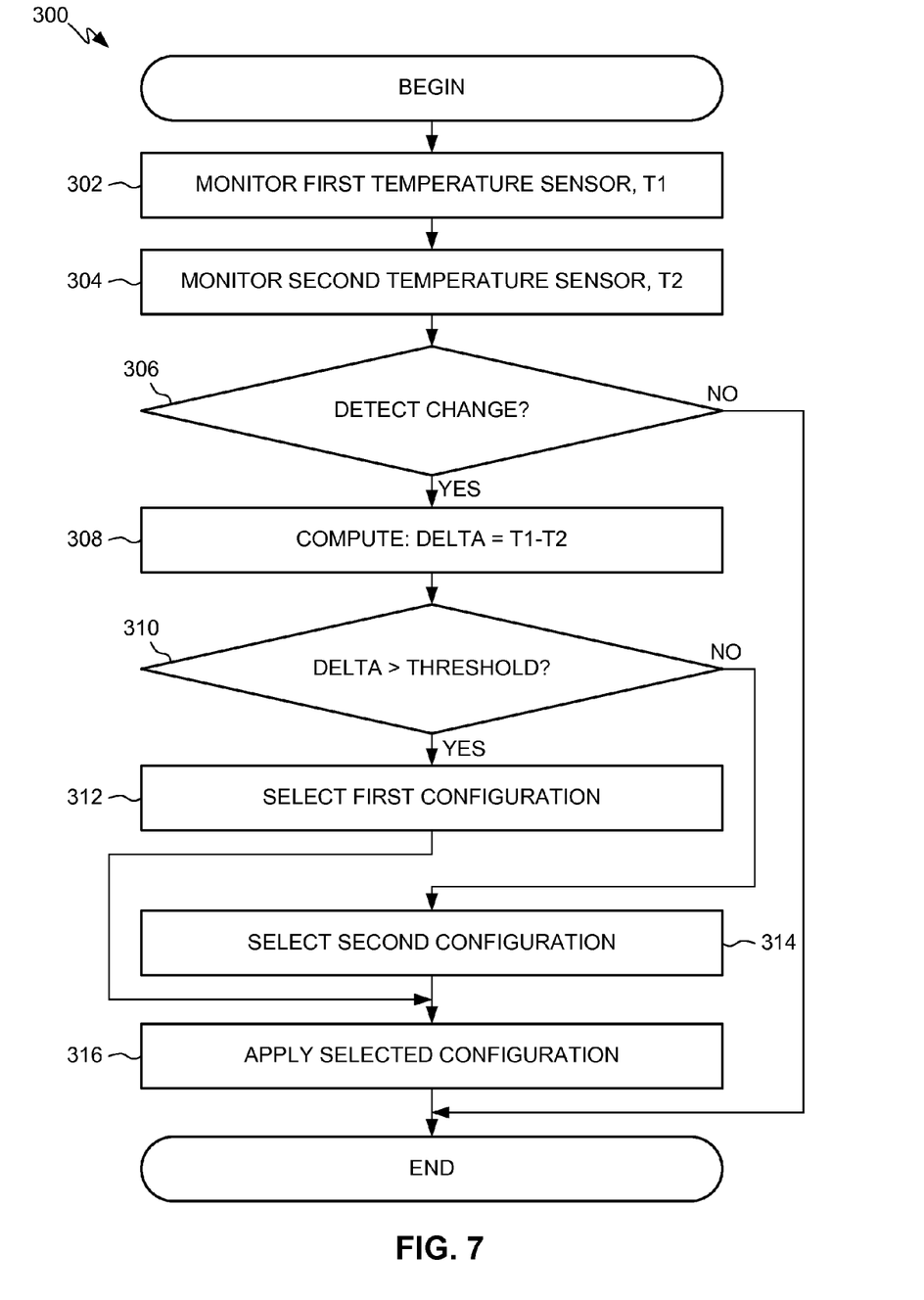
FIG. 7 is a flow diagram illustrating a method for thermal management in the portable computing device, in accordance with an exemplary embodiment.

In FIG. 7, an exemplary method 300 for thermal management in PCD 100 or similar devices is illustrated. PCD 100 may be configured to perform the method through the above-described hardware and software elements.

As indicated by block 302, at least one first temperature sensor is monitored. Such a first temperature sensor may be one of internal temperature sensors 157A. In an embodiment having multiple internal temperature sensors 157A, multiple internal temperature sensors 157A may be monitored, and the one producing signals representing the highest temperature may be selected as a first temperature value "T1." Alternatively, in an embodiment having multiple internal temperature sensors 157A, multiple internal temperature sensors 157A may be monitored, and the first temperature value ("T1") may be obtained in response to two or more of internal temperature sensors 157A. For example, the readings of two internal temperature sensors 157A, such as one in CPU 110 and another in GPU 135, may be summed to produced a first temperature value ("T1"). As indicated by block 304, a second temperature sensor is monitored. Such a second temperature sensor may be one of external temperature sensors 157B. The temperature represented by the signals produced by such a second temperature sensor may be referred to as a second temperature value "T2." Monitor module 114 may monitor such temperature sensors 157.

As indicated by block 306, it is determined whether a temperature change is detected. Monitor module 114 may detect such a temperature change by comparing successive samples of the signals received from the various temperature sensors 157. Monitor module 114 may also provide information indicating the two temperature values T1 and T2 to workload determination module 101.

As indicated by block 308, the difference or delta between the two temperature values T1 and T2 is determined. Workload determination module 101 may compute such a difference or delta by subtracting T2 from T1 or vice versa. As the time constant of one of internal temperature sensors 157A is generally substantially lower than the time constant of one of external temperature sensors 157B, a large positive difference or delta (T1−T2) may be more indicative of an instantaneous workload than a steady workload.

As indicated by block 310, the difference or delta is compared with a threshold value. If the difference or delta exceeds the threshold, for example, then the first thermal management configuration 294 (FIG. 6) is selected, as indicated by block 312. For example, the first thermal management configuration 294 may be optimized for an instantaneous workload. If the difference or delta does not exceed the threshold, then the second thermal management configuration 296 (FIG. 6) is selected, as indicated by block 314. For example, the second thermal management configuration 296 may be optimized for a steady workload. The selected one of thermal management configurations 294 and 296 is then applied to PCD 100. Workload determination module 101 may perform the aforementioned comparison and selection. Workload determination module 101 may also apply the selected configuration to the associated elements of PCD 100 by retrieving the thermal parameters or information included in the selected one of thermal management configurations 284 and 296 from memory 112 and providing them to thermal management logic 260 (FIG. 6). Alternatively, thermal management module 260 may apply or assist in applying the selected configuration to the associated elements of PCD 100. As described above, such thermal parameters or information may include, for example, the frequencies of clocks applied to various processors or the workload levels assigned to various processors. Each of thermal management configurations 294 and 296 may include any number of such parameters.

It should be understood that in an embodiment in which the first temperature value T1 is responsive to a die temperature (sensed by one of internal temperature sensors 157A) and the second temperature value T2 is responsive to a skin temperature, a difference or delta T1−T2 that exceeds the threshold value may be indicative of an instantaneous workload causing the temperature increase, while a difference or delta that does not exceed the threshold may be indicative of a steady workload causing the temperature increase. However, in an alternative embodiment in which the second temperature value T2 is responsive to a die temperature and the first temperature value T1 is responsive to a skin temperature, a difference or delta T1−T2 that exceeds the threshold value may be indicative of a steady workload causing the temperature increase, while a difference or delta that does not exceed the threshold may be indicative of an instantaneous workload causing the temperature increase. In other words, either of the die temperature or the skin temperature can be subtracted from the other without departing from the scope of the invention.

A set of thermal parameters such as clock frequency and processor or core workload that optimize thermal performance of PCD 100 for a steady workload could result in sub-optimal thermal performance if applied when a temperature increase in PCD 100 is not caused by a steady workload increase but rather by an instantaneous workload increase. Likewise, such thermal parameters that optimize thermal performance of PCD 100 for an instantaneous workload could result in sub-optimal thermal performance if applied when a temperature increase in PCD 100 is not caused by an instantaneous workload increase but rather by a steady workload increase. Embodiments of the present invention address this potential problem by determining whether a temperature increase is caused by a steady workload increase or an instantaneous workload increase and, if it is determined that the temperature increase is caused by a steady workload increase, applying a set or configuration of thermal parameters that optimizes thermal performance for a steady workload or, if it is determined that the temperature increase is caused by an instantaneous workload increase, applying a set or configuration of thermal parameters that optimizes thermal performance for an instantaneous workload.

Although certain acts or steps in the above-described process flows naturally precede others for the exemplary embodiments to operate as described, the invention is not limited to the order of those acts or steps if such order or sequence does not alter the functionality of the invention. That is, it is recognized that some acts or steps may performed before, after, or parallel (substantially simultaneously with) other acts or steps without departing from the scope and spirit of the invention. In some instances, certain acts or steps may be omitted or not performed without departing from the invention. Further, words such as "thereafter," "then," "next," etc., are not intended to limit the order of the acts or steps. These words are simply used to guide the reader through the descriptions of the exemplary methods.

Additionally, one of ordinary skill in the art is capable of writing computer code or identifying appropriate hardware and/or circuits to implement the disclosed invention without difficulty, based on the flow diagrams and associated description in this specification, for example.

Therefore, disclosure of a particular set of program code instructions or detailed hardware devices is not considered necessary for an adequate understanding of how to make and use the invention. The inventive functionality of the claimed computer-implemented processes is explained in the above description and in conjunction with the drawing figures, which may illustrate various process flows.

In one or more exemplary aspects, the functions described may be implemented in hardware, software, firmware, or any combination thereof. If implemented in software, the functions may be embodied in computer-executable instructions or code stored on a computer-readable medium. Computer-readable media include any available media that may be accessed by a computer or similar computing or communication device. By way of example, and not limitation, such computer-readable media may comprise RAM, ROM, EEPROM, NAND flash, NOR flash, M-RAM, P-RAM, R-RAM, CD-ROM or other optical, magnetic, solid-state, etc., data storage media. It should be noted that a combination of a non-transitory computer-readable storage medium and the computer-executable logic or instructions stored therein for execution by a processor defines a "computer program product" as that term is understood in the patent lexicon.

Alternative embodiments will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A method for thermal management in a portable computing device, the method comprising:
    monitoring a plurality of temperature sensors including at least one first temperature sensor on an integrated circuit die and at least one second temperature sensor not on the integrated circuit die but within a housing of the portable computing device, wherein a time constant of the first temperature sensor is less than a time constant of the second temperature sensor;
    detecting a temperature change in response to monitoring the plurality of temperature sensors;
    in response to detecting a temperature change, computing a difference between a first temperature value responsive to the at least one first temperature sensor and a second temperature value responsive to the at least one second temperature sensor;
    comparing the difference with a threshold value to determine a workload;
    selecting one of a first thermal management configuration and a second thermal management configuration in response to a result of comparing the difference with the threshold value; and
    applying a selected one of the first thermal management configuration and the second thermal management configuration to the portable computing device.

2. The method of claim 1, wherein applying a selected one of the first thermal management configuration and the second thermal management configuration to the portable computing device comprises accessing a memory in which the first thermal management configuration and second thermal management configuration are stored.

3. The method of claim 1, wherein the first thermal management configuration includes applying a first clock frequency to a processing element of the integrated circuit, and the second thermal management configuration includes applying a second clock frequency to the processing element of the integrated circuit.

4. The method of claim 1, wherein monitoring the plurality of temperature sensors includes monitoring the at least one first temperature sensor associated with a processor of the integrated circuit.

5. The method of claim 4, wherein the at least one first temperature sensor comprises a proportional to absolute temperature ("PTAT") sensor.

6. The method of claim 1, wherein the at least one second temperature sensor comprises a thermistor.

7. The method of claim 1, wherein the portable computing device comprises at least one of a mobile telephone, a personal digital assistant, a pager, a smartphone, a navigation device, and a hand-held computer with a wireless connection or link.

8. A system for thermal management in a portable computing device, the system comprising:
    at least one first temperature sensor on an integrated circuit die, the at least one first temperature sensor including a first time constant;
    at least one second temperature sensor not on the integrated circuit die but within a housing of the portable computing device, the at least one second temperature sensor including a second time constant greater than the first time constant;
    a monitor module configured to monitor the at least one first temperature sensor and the at least one second temperature sensor and to detect a temperature change;
    a workload determination module configured to compute a difference between a first temperature value responsive to the at least one first temperature sensor and a second temperature value responsive to the at least one second temperature sensor to determine a workload, to compare the difference with a threshold value, and to select one of a first thermal management configuration and a second thermal management configuration in response to a result of comparing the difference with the threshold value; and
    a thermal management module configured to apply the selected one of the first thermal management configuration and the second thermal management configuration to the portable computing device.

9. The system of claim 8, wherein the first thermal management configuration and second thermal management configuration are stored in a memory.

10. The system of claim 8, wherein the first thermal management configuration includes applying a first clock frequency to a processing element of the integrated circuit, and the second thermal management configuration includes applying a second clock frequency to the processing element of the integrated circuit.

11. The system of claim 8, wherein the at least one first temperature sensor is associated with a processor of the integrated circuit.

12. The system of claim 11, wherein the at least one first temperature sensor is a proportional to absolute temperature ("PTAT") sensor.

13. The system of claim 8, wherein the at least one second temperature sensor is a thermistor.

14. The system of claim 8, wherein the portable computing device comprises at least one of a mobile telephone, a personal digital assistant, a pager, a smartphone, a navigation device, and a hand-held computer with a wireless connection or link.

15. A system for thermal management in a portable computing device, the system comprising:
    means for monitoring a plurality of temperature sensors including at least one first temperature sensor on an integrated circuit die and at least one second temperature sensor not on the integrated circuit die but within a housing of the portable computing device wherein a time constant of the first temperature sensor is less than a time constant of the second temperature sensor;
    means for detecting a temperature change in response to monitoring the plurality of temperature sensors;
    means for, in response to detecting a temperature change, computing a difference between a first temperature value responsive to the at least one first temperature sensor and a second temperature value responsive to the at least one second temperature sensor to determine a workload;
    means for comparing the difference with a threshold value;
    means for selecting one of a first thermal management configuration and a second thermal management configuration in response to a result of comparing the difference with the threshold value; and
    means for applying a selected one of the first thermal management configuration and the second thermal management configuration to the portable computing device.

16. The system of claim 15, wherein the first thermal management configuration and second thermal management configuration are stored in a memory.

17. The system of claim 15, wherein the first thermal management configuration includes applying a first clock frequency to a processing element of the integrated circuit, and the second thermal management configuration includes applying a second clock frequency to the processing element of the integrated circuit.

18. The system of claim 15, wherein the at least one first temperature sensor is associated with a processor of the integrated circuit.

19. The system of claim 18, wherein the at least one first temperature sensor is a proportional to absolute temperature ("PTAT") sensor.

20. The system of claim 15, wherein the at least one second temperature sensor is a thermistor.

21. The system of claim 15, wherein the portable computing device comprises at least one of a mobile telephone, a personal digital assistant, a pager, a smartphone, a navigation device, and a hand-held computer with a wireless connection or link.

22. A computer program product comprising processor-executable logic embodied in a non-transitory storage medium, execution of the logic by a processing system of a portable computing device configuring the processing system to:
    monitor a plurality of temperature sensors including at least one first temperature sensor on an integrated circuit die and at least one second temperature sensor not on the integrated circuit die but within a housing of the portable computing device, wherein a time constant of the first temperature sensor is less than a time constant of the second temperature sensor;
    detect a temperature change in response to monitoring the plurality of temperature sensors;
    in response to detecting a temperature change, compute a difference between a first temperature value responsive to the first temperature sensor and a second temperature value responsive to the second temperature sensor to determine a workload;
    compare the difference with a threshold value;
    select one of a first thermal management configuration and a second thermal management configuration in response to a result of comparing the difference with the threshold value; and
    apply a selected one of the first thermal management configuration and the second thermal management configuration to the portable computing device.

23. The computer program product of claim 22, wherein the processor is configured to apply a selected one of the first thermal management configuration and the second thermal management configuration to the portable computing device by being configured to access a memory in which the first thermal management configuration and the second thermal management configuration are stored.

24. The computer program product of claim 22, wherein the first thermal management configuration includes applying a first clock frequency to a processing element of the integrated circuit, and the second thermal management configuration includes applying a second clock frequency to the processing element of the integrated circuit.

25. The computer program product of claim 22, wherein the processor is configured to monitor the plurality of temperature sensors by being configured to monitoring the first temperature sensor associated with a processor of the integrated circuit.

26. The computer program product of claim 25, wherein the at least one first temperature sensor comprises a proportional to absolute temperature ("PTAT") sensor.

27. The computer program product of claim 22, wherein the at least one second temperature sensor comprises a thermistor.

* * * * *